United States Patent
Patel et al.

(10) Patent No.: US 9,913,316 B2
(45) Date of Patent: Mar. 6, 2018

(54) CONNECTED DISCONTINUOUS RECEPTION (CDRX) MANAGEMENT IN MULTI-SUBSCRIBER IDENTITY MODULE (SIM) WIRELESS COMMUNICATION DEVICES

(71) Applicant: QUALCOMM Incorporated, San Diego, CA (US)

(72) Inventors: Harinath Reddy Patel, Mahabubnagar (IN); Pankaj Bansal, Jaipur (IN); Ravi Kanth Kotreka, Hyderabad (IN); Pankaj Gupta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/085,895

(22) Filed: Mar. 30, 2016

(65) Prior Publication Data

US 2017/0290086 A1 Oct. 5, 2017

(51) Int. Cl.
*H04W 76/04* (2009.01)
*H04W 24/08* (2009.01)
*H04W 8/18* (2009.01)
*H04W 52/02* (2009.01)
*H04W 88/06* (2009.01)

(52) U.S. Cl.
CPC ......... *H04W 76/048* (2013.01); *H04W 8/183* (2013.01); *H04W 24/08* (2013.01); *H04W 52/0216* (2013.01); *H04W 88/06* (2013.01)

(58) Field of Classification Search
CPC ......... H04W 2/04; H04W 8/18; H04W 8/183; H04W 24/08; H04W 52/02; H04W 52/028; H04W 52/0216; H04W 52/0232; H04W 72/02; H04W 72/0446; H04W 76/04;

(Continued)

(56) References Cited

U.S. PATENT DOCUMENTS 8,023,467 B2 * 9/2011 Wu ............... H04W 76/048 370/331
8,121,634 B2 * 2/2012 Aoyama ............. H04W 76/048 370/327

(Continued)

OTHER PUBLICATIONS

International Search Report and Written Opinion—PCT/US2017/022691—ISA/EPO—dated Jun. 22, 2017.

*Primary Examiner* — Tri H Phan
(74) *Attorney, Agent, or Firm* — Paradice and Li LLP

(57) ABSTRACT

Embodiments described herein relate to extending an awake period (on duration) or an inactivity timer duration in a Connected Discontinuous Reception (CDRX) mode for a first subscription based on activities of a second subscription. A method according to some embodiments includes determining that the awake period of the CDRX cycle associated with the first subscription collides with the activities of the second subscription, and extending the awake period by an extended awake period in response to determining that the awake period collides with the activities of the second subscription. In addition, a method according to some embodiments includes determining that the inactivity timer duration collides with the activities of the second subscription, and extending the inactivity timer duration for an extended inactivity timer duration in response to determining that the inactivity timer duration collides with the activities of the second subscription.

32 Claims, 9 Drawing Sheets

(58) Field of Classification Search
CPC . H04W 76/048; H04W 84/042; H04W 88/06; Y02B 60/50
See application file for complete search history.

(56) References Cited

U.S. PATENT DOCUMENTS

| | | | | |
|---|---|---|---|---|
| 8,711,809 | B2* | 4/2014 | Wu | H04W 76/048 370/331 |
| 8,886,232 | B2* | 11/2014 | Muller | H04W 68/02 370/349 |
| 9,386,528 | B2* | 7/2016 | Kanamarlapudi | H04W 52/0241 |
| 9,516,694 | B2* | 12/2016 | Gopal | H04W 76/048 |
| 9,661,674 | B2* | 5/2017 | Su | H04W 76/025 |
| 2008/0268845 | A1* | 10/2008 | Wu | H04W 76/048 455/436 |
| 2013/0201892 | A1* | 8/2013 | Holma | H04W 76/048 370/311 |
| 2013/0301499 | A1* | 11/2013 | Jain | H04W 76/048 370/311 |
| 2014/0004842 | A1* | 1/2014 | Lindoff | H04W 88/06 455/418 |
| 2014/0045489 | A1* | 2/2014 | Josso | H04W 56/0035 455/423 |
| 2014/0213235 | A1* | 7/2014 | Lou | H04B 15/04 455/418 |
| 2015/0257099 | A1 | 9/2015 | Su et al. | |
| 2016/0128129 | A1* | 5/2016 | Kahtava | H04L 1/00 370/311 |
| 2016/0198408 | A1* | 7/2016 | Jhang | H04W 76/048 370/311 |

* cited by examiner

CONNECTED DISCONTINUOUS RECEPTION (CDRX) MANAGEMENT IN MULTI-SUBSCRIBER IDENTITY MODULE (SIM) WIRELESS COMMUNICATION DEVICES

BACKGROUND

A wireless communication device, such as a mobile phone device or a smart phone, may include two or more Subscriber Identity Modules (SIMs). Each SIM may enable at least one subscription via a Radio Access Technology (RAT). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

A multi-SIM wireless communication device (e.g., a MSMS wireless communication device) may employ a Discontinuous Reception (DRX) mode to conserve power. The wireless communication device may be in a Connected DRX (CDRX) mode while in a Radio Resource Control (RRC)-connected state, as per Release 8, $3^{rd}$ Generation Partnership Project (3GPP). For example, when the wireless communication device is not engaged in active data transfer on a first subscription, a network associated with the first subscription may configure the first subscription of the wireless communication device to be in the CDRX mode. For example, a base station (e.g., an evolved Node B (eNodeB)) of the network of the first subscription may configure the wireless communication device into the CDRX mode. In a cycle of the CDRX mode, the wireless communication device may be awake (engaged in activities with Radio Frequency (RF) resources of the wireless communication device) for a period of time (e.g., an awake period or "on duration") for monitoring a Physical Downlink Shared Channel (PDSCH). Within the same cycle, the wireless communication device may sleep (not engaged in reception activities by idling the RF resource) for a period of time (e.g., a sleep period or "off duration") to conserve power. Accordingly, in response to the wireless communication device receiving any downlink data indicated by the PDSCH from the network in the awake period, the wireless communication device may abandon the CDRX mode and continuously monitor the PDSCH for downlink data (e.g., continuous reception); otherwise, the wireless communication device may sleep in the sleep period to avoid power consumption.

In some instances, activities of a second subscription of the multi-SIM wireless communication device may occur during the awake period or inactivity timer duration of the first subscription. Such activities may include page decoding or other idle-mode activities of the second subscription. Given that idle-mode activities of the second subscription may have priority over first subscription activities in the awake period or in the inactivity timer duration, the wireless communication device may not decode the PDSCH for the first subscription if the first subscription awake period or the inactivity timer duration overlaps with the time the activities of the second subscription occur. Thus, if the network allocates downlink data for the first subscription in the PDSCH and the corresponding portion of the first subscription awake period or inactivity timer duration collides with the time the activities of the second subscription occur, the first subscription may not be able to decode the allocated downlink data.

To recover missed downlink data, the wireless communication device may attempt to decode in a next CDRX cycle. However, a successful recovery attempt may be contingent upon the time the activities of the second subscription occur not colliding with the awake period of the first subscription and validities of L1/Radio Link Control (RLC) level retransmission. Repeated overlap between the awake periods (or inactivity timer duration) of the first subscription and the time the activities of the second subscription occur may result in repeated failure to decode allocated downlink data on the first subscription, thus negatively impacting the user experience due to inefficiency.

SUMMARY

Embodiments described herein are related to scheduling Radio Frequency (RF) resource usage in a wireless communication device such as, but not limited to, a Multi-SIM-Multi-Standby (MSMS) wireless communication device, to avoid data loss due to collisions. The wireless communication device may have a first subscription in a Connected DRX (CDRX) mode and a second subscription. The first subscription may be enabled by a first Subscriber Identity Module (SIM). The second subscription may be enabled by a second SIM. Activities (e.g., pages or other idle mode activities) of the second subscription may have higher priority than that of the CDRX activities of the first subscription. A CDRX cycle of the first subscription may include an awake period and a sleep period.

In some embodiments, the wireless communication device may determine that at least a portion of the awake period may collide (overlap) with the time the activities of the second subscription occur. In response, the awake period may be extended for an extended awake period for receiving and decoding a Physical Downlink Shared Channel (PDSCH). The extended awake period may be scheduled to use the RF resource after the activities of the second subscription occur, referred to as tuning away to the second subscription. In response to ending the tune away period, the wireless communication device may be configured for another awake period (e.g., the extended awake period). In response to determining downlink data in the PDSCH being received during the extended awake period, the wireless communication device may abandon the CDRX mode and enter continuous monitoring of the PDSCH for downlink data. On the other hand, in response to determining that no downlink data in the PDSCH has been received during the awake period and the extended awake period, the wireless communication device may sleep per the CDRX cycle.

In response to the wireless communication device receiving and successfully decoding the downlink data in the PDSCH (e.g., during the awake period), an inactivity timer may be started. The inactivity timer may correspond to a period of time in which the wireless communication device may continuously monitor the PDSCH for every subframe for downlink data (e.g., continuous reception). In response to determining at least a portion of an inactivity timer duration (corresponding to the inactivity timer) collides with activities of the second subscription, the inactivity timer duration may be extended.

In some embodiments, a method for a wireless communication device having a first SIM associated with a first subscription and a second SIM associated with a second subscription to manage communications over the first subscription and the second subscription, the method including determining that data transfer during an awake period of a CDRX cycle associated with the first subscription collides with activities of the second subscription, and extending the awake period by an extended awake period in response to determining that the data transfer during the awake period collides with the activities of the second subscription.

In some embodiments, the method further includes configuring a RF resource of the wireless communication device to monitor downlink data in a PDSCH during the awake period.

In some embodiments, the method further includes tuning the RF resource away from the first subscription to the second subscription for the activities of the second subscription.

In some embodiments, determining that the data transfer during the awake period collides with the activities of the second subscription includes determining that at least a portion of the data transfer during the awake period collides with at least a portion of the activities of the second subscription.

In some embodiments, des the activities of the second subscription includes idle-mode reception activities of the second subscription.

In some embodiments, the idle-mode reception activities of the second subscription includes receiving and decoding pages of the second subscription.

In some embodiments, extending the awake period by the extended awake period includes configuring a RF resource of the wireless communication device to monitor downlink data in a PDSCH during the extended awake period.

In some embodiments, the method further includes receiving the downlink data in the PDSCH during the extended awake period, wherein the received downlink data corresponds to an identity of the wireless communication device and continuously monitoring for downlink data in the PDSCH in response to receiving the downlink data during the extended awake period.

In some embodiments, the extended awake period occurs after a tune-away period corresponding to the activities of the second subscription.

In some embodiments, a length of the extended awake period is 8 ms.

In some embodiments, a length of the extended awake period is determined based on HARQ processes.

In some embodiments, the first subscription is a Long Term Evolution (LTE) subscription associated with the CDRX.

In some embodiments, a wireless communication device includes at least one RF resource, a processor operably connected to said at least one RF resource configured to connect to a first SIM associated with a first subscription and to a second SIM associated with a second subscription, and configured to determine that data transfer during an awake period of a CDRX cycle associated with the first subscription collides with activities of the second subscription; and extend the awake period by an extended awake period in response to determining that the data transfer during the awake period collides with the activities of the second subscription and a memory.

In some embodiments, the processor is configured to extend the awake period by the extended awake period by configuring the at least one RF resource to monitor downlink data in a PDSCH during the extended awake period.

In some embodiments, the processor is further configured to receive the downlink data in the PDSCH during the extended awake period, wherein the received downlink data corresponds to an identity of the wireless communication device, and continuously monitor for downlink data in the PDSCH in response to receiving the downlink data during the extended awake period.

In some embodiments, a method for a wireless communication device having a first SIM associated with a first subscription and a second SIM associated with a second subscription to manage communications over the first subscription and the second subscription, the method including determining that an inactivity timer duration overlaps with the time the activities of the second subscription occur and extending the inactivity timer duration for an extended inactivity timer duration in response to determining that the inactivity timer duration overlaps with the time the activities of the second subscription occur.

In some embodiments, the method further includes configuring a RF resource of the wireless communication device to monitor downlink data in a PDSCH during an awake period of a CDRX cycle associated with the first subscription and receiving the downlink data during the awake period.

In some embodiments, the method further includes monitoring downlink data in a PDSCH during the inactivity timer duration.

In some embodiments, the method further includes tuning the RF resource away from the first subscription to the second subscription for the activities of the second subscription.

In some embodiments, determining that the inactivity timer duration collides with the time the activities of the second subscription occur includes determining that at least a portion of the inactivity timer duration collides with at least a portion of the time the activities of the second subscription occur.

In some embodiments, the at least a portion of the inactivity timer duration includes an end duration of the inactivity timer duration, wherein the end duration includes at least one subframe before expiration of the inactivity timer duration.

In some embodiments, the end duration includes 8 subframes before the expiration of the inactivity timer duration.

In some embodiments, the activities of the second subscription includes idle-mode reception activities of the second subscription.

In some embodiments, the idle-mode reception activities of the second mode includes receiving and decoding pages of the second subscription.

In some embodiments, extending the inactivity timer duration for the extended inactivity timer duration includes configuring a RF resource of the wireless communication device to monitor downlink data in a PDSCH during the extended inactivity timer duration.

In some embodiments, the method further includes receiving the downlink data during the extended inactivity timer duration and extending the inactivity timer duration for an additional inactivity timer duration in response to receiving the downlink data during the extended inactivity timer duration.

In some embodiments, the extended inactivity timer duration is after a tune-away period corresponding to the activities of the second subscription.

In some embodiments, wireless communication device includes at least one RF resource, a processor configured to connect to a first SIM associated with a first subscription and to a second SIM associated with a second subscription, and configured with processor-executable instructions to determine that an inactivity timer duration overlaps with the time activities of the second subscription occur and extend the inactivity timer duration for an extended inactivity timer duration in response to determining that the inactivity timer duration overlaps with the time the activities of the second subscription occur and a memory.

In some embodiments, the processor is configured to determine that an end duration of the inactivity timer duration overlaps with the time the activities of the second subscription occur, wherein the end duration includes at least one subframe before expiration of the inactivity timer duration.

In some embodiments, the processor is configured to extend the inactivity timer duration for the extended inactivity timer duration by configuring a RF resource of the wireless communication device to monitor downlink data in a PDSCH during the extended inactivity timer duration.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
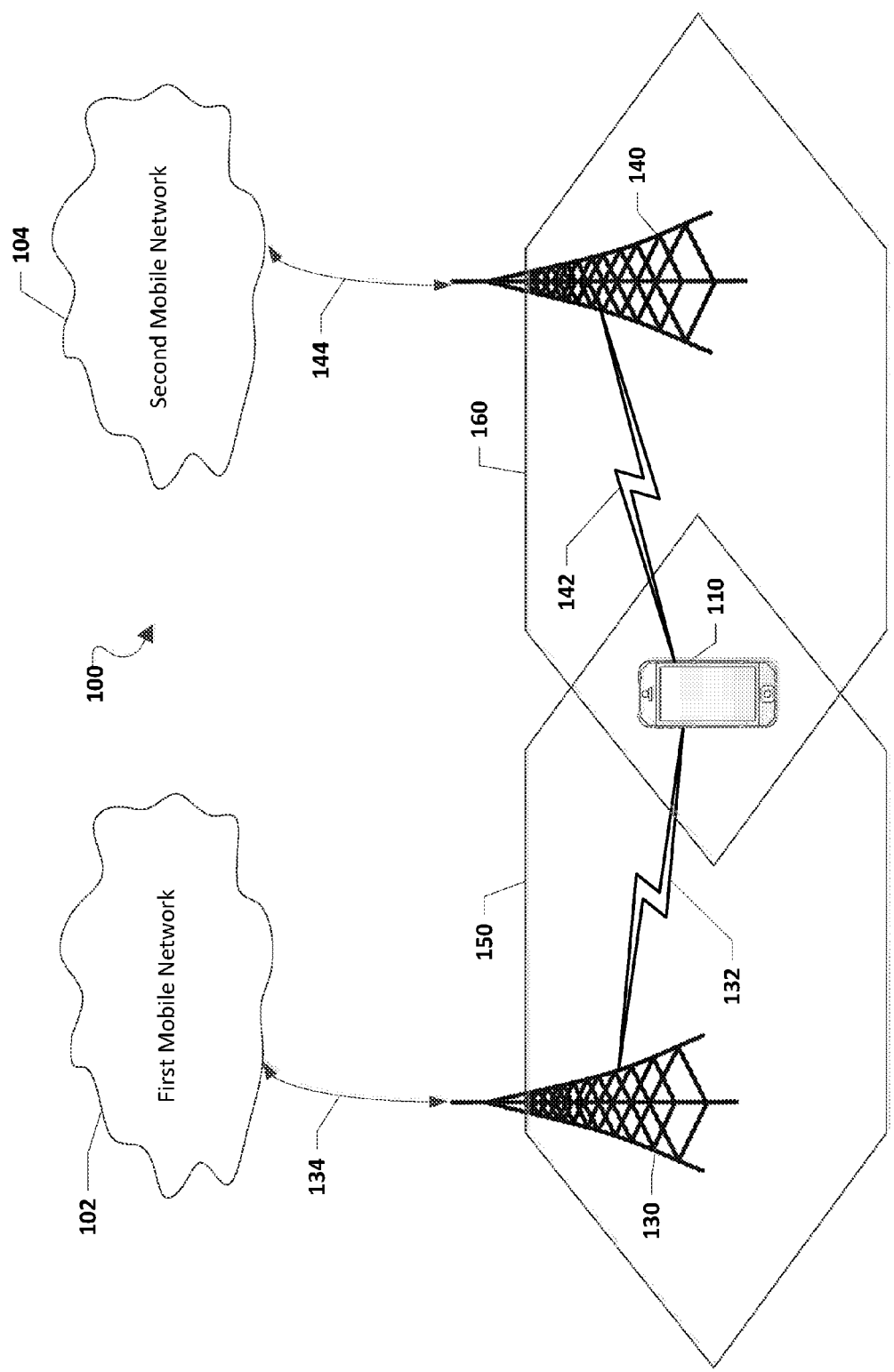
FIG. 1 is a schematic diagram of a communication system in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device, User Equipment (UE), or Mobile Station (MS), may include any one or all of cellular telephones, smart phones, personal or mobile multimedia players, personal data assistants, laptop computers, personal computers, tablet computers, smart books, palm-top computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide users of the wireless communication devices with access to one or multiple separate mobile communication networks. The mobile communication networks may be supported by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more subscriptions with one subscription being active at a given time may be a Multi-SIM-Multi-Standby (MSMS) communication device. In one example, the MSMS communication device may be a Dual-SIM-Dual-Standby (DSDS) communication device, which may include two SIMs that may both be active on standby, but one may be deactivated when the other one may be activated. In another example, the MSMS communication device may be a Triple-SIM-Triple-Standby (TSTS) communication device, which includes three SIMs that may all be active on standby, where two may be deactivated when the third one may be in use. In other examples, the MSMS communication device may be other suitable multi-SIM communication devices, with, for example, four or more SIMs, such that when one may be in use, the others may be deactivated.

On the other hand, a wireless communication device that includes a plurality of SIMs and connects to two or more separate (or same) subscriptions or networks with two or more subscriptions or networks being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Generally, embodiments described herein may be applicable to a MSMS wireless communication device having at least a first SIM and a second SIM. Illustrating with a non-limiting example, the first SIM may be associated with a first subscription, and the second SIM may be associated with a second subscription. The first subscription may be an LTE (Frequency Division Duplex (FDD)) subscription. The second subscription may be another suitable subscription such as, but not limited to, a GSM subscription. Additionally or alternatively, the embodiments may be applicable to a MSMA wireless communication device having its first subscription blanked by activities (also referring to activity) of the second subscription due to interference, activity pattern, power back-off, and/or the like associated with the second subscription, such that activities of the second subscription may cause interruptions to the first subscription in a manner similar to described with respect to tune-aways.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be the wireless device to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

Referring generally to the FIGS., embodiments described herein are concerned with extending an awake period (e.g., an on duration) or an inactivity timer duration when the wireless communication device is in a Connected Discontinuous Reception (CDRX) mode. The CDRX mode may be used to conserve power. For example, a given CDRX cycle may include the awake period and a sleep period (e.g., an off duration). The wireless communication device may shut off a Radio Frequency (RF) resource during the sleep period to conserve power. A network (e.g., a base station associated thereof) may not schedule transmissions with the wireless communication during the sleep period of that wireless communication device.

A CDRX cycle may be classified as a Short CDRX cycle or Long CDRX cycle. For instance, the wireless communication device may first be in a Short CDRX cycle and transitions into a Long CDRX cycle after expiration of an inactivity timer. Embodiments described herein relate to both the Short CDRX cycles and Long CDRX cycles. Thus, "CDRX cycle" as used herein may refer to the Short CDRX cycle or Long CDRX cycle. Illustrating with a non-limiting example, a Long CDRX cycle may have a length of 320 ms, with the awake period having a length of 10 ms. The sleep period of the Long CDRX may have a length of 310 ms. Illustrating with another non-limiting example, a Short CDRX cycle may have a length of 40 ms, with the awake period having a length of 10 ms. The sleep period of the Short CDRX may have a length of 30 ms. Other suitable lengths of the Short CDRX cycle or Long CDRX cycle may likewise benefit from the embodiments described herein.

In some embodiments, the awake period of the first subscription may be extended based on when the activities of the second subscription occur. Tune-aways corresponding to the activities of the second subscription may have a higher priority than that of the awake period of the CDRX cycle. Thus, if the tune-away to the second subscription collides or overlaps with the awake period of the first subscription, the awake period may be interrupted or cut short in favor of tuning away to the second subscription. In response to determining that such a scenario has occurred, the wireless communication device may extend the awake period within the same CDRX cycle by adding an extended awake period. In some embodiments, the extended awake period may be added after the activities of the second subscription. That is, after the activities of the second subscription, the RF resource may be tuned back to the first subscription for the extended awake period. Accordingly, the first subscription may have an opportunity to monitor for downlink data within the same CDRX cycle, instead of sleeping until the awake period of the next CDRX cycle.

In some embodiments, the inactivity timer duration may be extended based on the activities of the second subscription. The tune-aways corresponding to the activities of the second subscription may have a higher priority than that of the inactivity timer duration of the CDRX cycle. Thus, if the tune-away to the second subscription collides or overlaps with the inactivity timer duration of the first subscription, the inactivity timer duration may be interrupted or cut short in favor of tuning away to the second subscription. In response to determining that such a scenario has occurred, the wireless communication device may extend the inactivity timer duration within the same CDRX cycle by adding an extended inactivity timer duration. In some embodiments, the extended inactivity timer duration may be added after the activities of the second subscription. That is, after the activities of the second subscription, the RF resource may be tuned back to the first subscription for the extended inactivity timer duration. Accordingly, the first subscription may have an opportunity to monitor for downlink data within the same CDRX cycle in the extended inactivity timer duration.

Various embodiments may be implemented within a communication system 100, an example of which is illustrated in FIG. 1. Referring to FIG. 1, a first mobile network 102 and a second mobile network 104 may each associate with a plurality of cellular base stations (e.g., a first base station 130 and a second base station 140, respectively). The first base station 130 may broadcast the first mobile network 102 in a first serving cell 150. The second base station 140 may broadcast the second mobile network 104 in a second serving cell 160. A wireless communication device 110 may be associated with (within effective boundaries of) both the first serving cell 150 and the second serving cell 160.

The wireless communication device 110 may be in communication with the first mobile network 102 through a first cellular connection 132 to the first base station 130. The first cellular connection 132 may correspond to the first RAT of the wireless communication device 110. The wireless communication device 110 may also be in communication with the second mobile network 104 through a second cellular connection 142 to the second base station 140. The second cellular connection 142 may correspond to the second RAT of the wireless communication device 110, as in a multi-SIM context. The first base station 130 may be in communication with the first mobile network 102 over a wired or wireless connection 134. The second base station 140 may be in communication with the second mobile network 104 over a wired or wireless connection 144.

The first cellular connection 132 and the second cellular connection 142 may be made through two-way wireless communication links. Each of the wireless communication links may be enable by any suitable protocol (RAT) including, but not limited to, FDMA, TDMA, CDMA (e.g., EVDO), UMTS (e.g., WCDMA, LTE, HSDPA, or the like), GSM, 1×, GPRS, Wi-Fi, PCS, and/or another protocol used in a wireless communications network or a data communications network. By way of illustrating with a non-limiting example, the first cellular connection 132 may be a LTE connection. The second cellular connection 142 may be a LTE, WCDMA, GSM; or 1× connection. Other RATs (such as, but not limited to, HSDPA, EVDO, and the like) may be implemented in a similar manner.

Each of the first base station 130 and the second base station 140 may include at least one antenna group or transmission station located in the same or different areas. The at least one antenna group or transmission station may be associated with signal transmission and reception. Each of the first base station 130 and the second base station 140 may include one or more processors, modulators, multiplexers, demodulators, demultiplexers, antennas, and the like for performing the functions described herein. In some embodiments, the first base station 130 and the second base station 140 may be an access point, Node B, evolved Node B (eNodeB or eNB), base transceiver station (BTS), or the like.

In various embodiments, the wireless communication device 110 may be configured to access the first mobile network 102 and the second mobile network 104 by virtue of the multi-SIM and/or the multi-mode SIM configuration of the wireless communication device 110 (e.g., via the first cellular connection 132 and the second cellular connection 142). When a SIM corresponding to a RAT is inserted, the wireless communication device 110 may access the mobile communication network associated with that RAT based on the information stored on the SIM through registrations and call setups.

While the wireless communication device 110 is shown connected to the mobile networks 102 and 104 via two cellular connections, in other embodiments (not shown), the wireless communication device 110 may establish additional network connections using at least one additional RAT.

In some embodiments, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some embodiments, the wireless communication device 110 may establish a wireless connection with a wireless access point (not shown), such as over a Wi-Fi connection. The wireless access point may be configured to connect to the Internet or another network over a wired connection.

Figure 2:
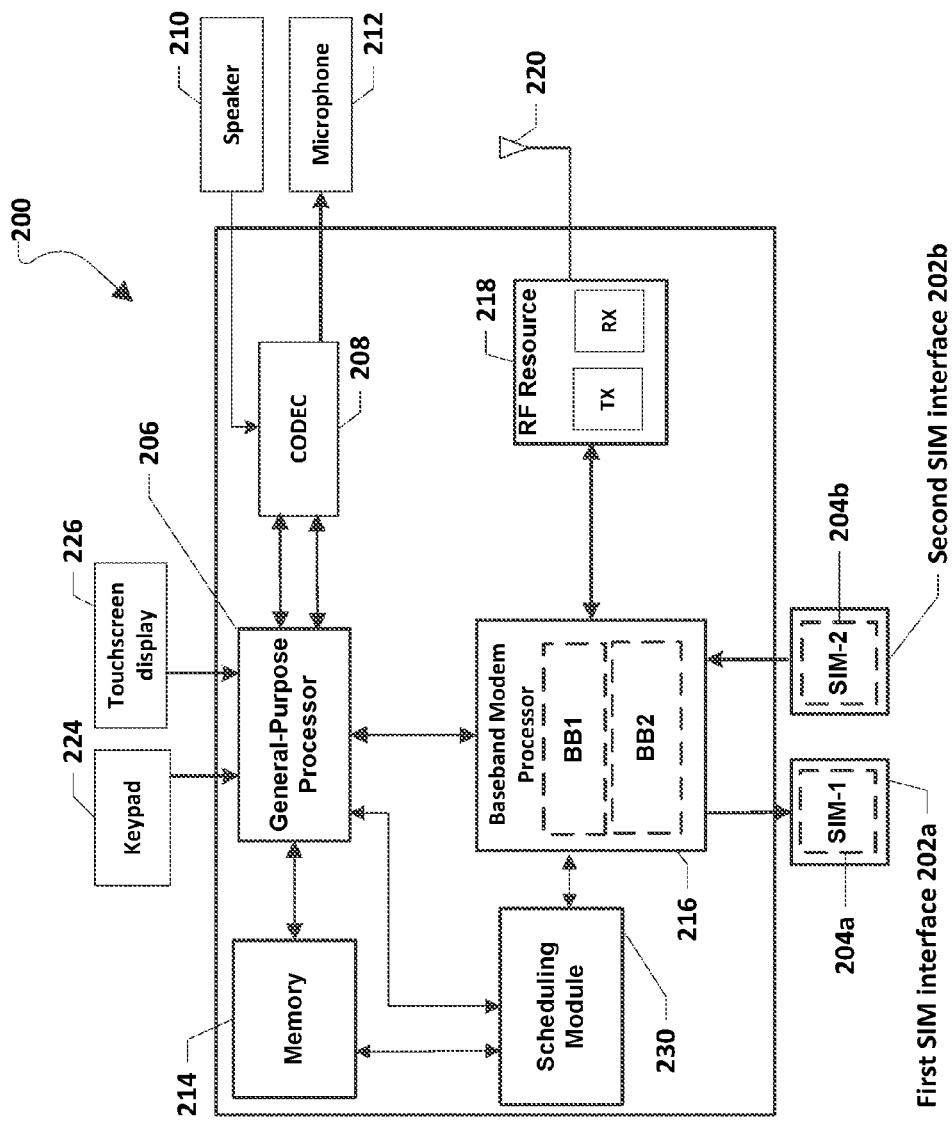
FIG. 2 is a component block diagram of an example of a wireless communication device according to various embodiments.

FIG. 2 is a functional block diagram of a wireless communication device 200 suitable for implementing various embodiments. According to various embodiments, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a that is associated with the first subscription (corresponding to the first mobile network 102). The wireless communication device 200 may also include a second SIM interface 202b, which may receive a second identity module SIM-2 204b associated with the second subscription (corresponding to the second mobile network 104).

A SIM (e.g., SIM-1 204a, SIM-2 204b, and/or the like) in various embodiments may be a Universal Integrated Circuit Card (UICC) configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various embodiments may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the SIM-1 204a, the SIM-2 204b, and/or the like) in the wireless communication device 200 may be associated with at least one baseband-RF resource chain. A baseband-RF resource chain may include the baseband modem processor 216, which may perform baseband/modem functions for communications on the SIMs. The baseband modem processor 216 may include one or more amplifiers and radios, referred to generally herein as a RF resource 218 or RF chain.

The embodiments described herein may be applicable to wireless communication devices in which the SIMs 204a and 204b share a common set of RF resource (particularly, the RF resource 218). Embodiments described herein may also be applicable to wireless communication devices in which each of the SIMs 204a and 204b has a separate RF resource, but activities of one of the SIMs 204a and 204b may be deactivated while the other one of the SIMs 204a and 204b is active.

The RF resource 218 may include at least one transceiver that perform transmit/receive functions for the associated SIMs 204a and 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some embodiments, the general-purpose processor 206, the memory 214, the baseband modem processor 216, and the RF resource 218 may be included in the wireless communication device 200 as a system-on-chip. In some embodiments, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a scheduling module 230 configured to perform the functions described herein with respect to scheduling activities of the first subscription and the second subscription. The scheduling module 230 may add an extended awake period in some embodiments. The scheduling module may add an extended inactivity timer duration in some embodiments. The scheduling module 230 may communicate with the software layers corresponding to both the first subscription and the second subscription. Particularly, the scheduling module 230 may communicate with the software layer (e.g., L1) corresponding to the second subscription to obtain activities of the second subscription that have been scheduled in advance. The scheduling module 230 may use the information regarding the future activities of the second subscription to schedule the extended awake period and/or the extended inactivity timer duration in the manner described.

In some embodiments, the scheduling module 230 may be implemented within the general-purpose processor 206. For example, the scheduling module 230 may be implemented as a software application stored within the memory 214 and executed by the general-purpose processor 206. Accordingly, such embodiments can be implemented with minimal additional hardware costs. However, other embodiments relate to systems and processes implemented with dedicated hardware specifically configured for performing operations described herein with respect to the scheduling module 230. For example, the scheduling module 230 may be implemented as a separate processing component (i.e., separate from the general-purpose processor 206). The scheduling module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further embodiments, such hardware and/or software may be added to the wireless communication device 200 post-manufacture, such as by installing one or more hardware devices and/or software applications onto the wireless communication device 200.

In some embodiments, the wireless communication device 200 may include, among other things, additional SIM cards, SIM interfaces, at least another RF resource associated with the additional SIM cards, and additional antennas for connecting to additional mobile networks.

Figure 3:
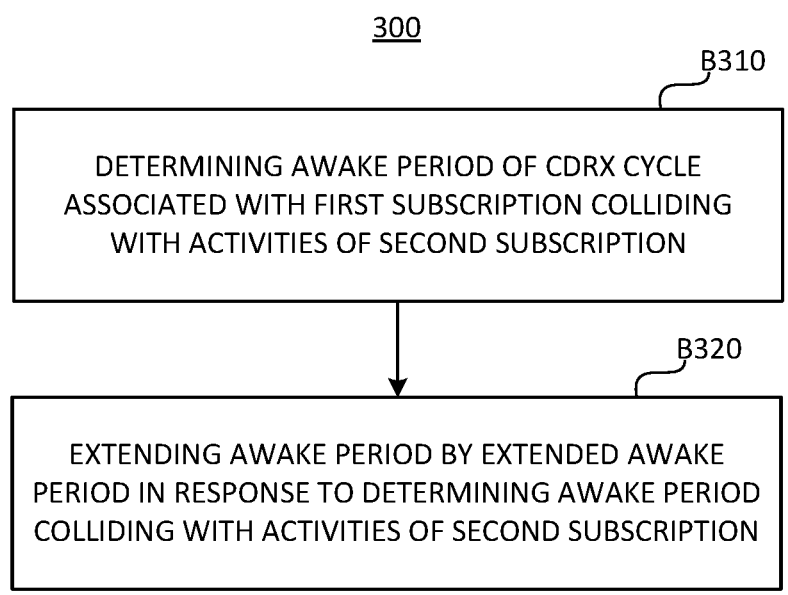
FIG. 3 is a process flowchart diagram illustrating an example of a scheduling method according to various embodiments.
Figure 4:
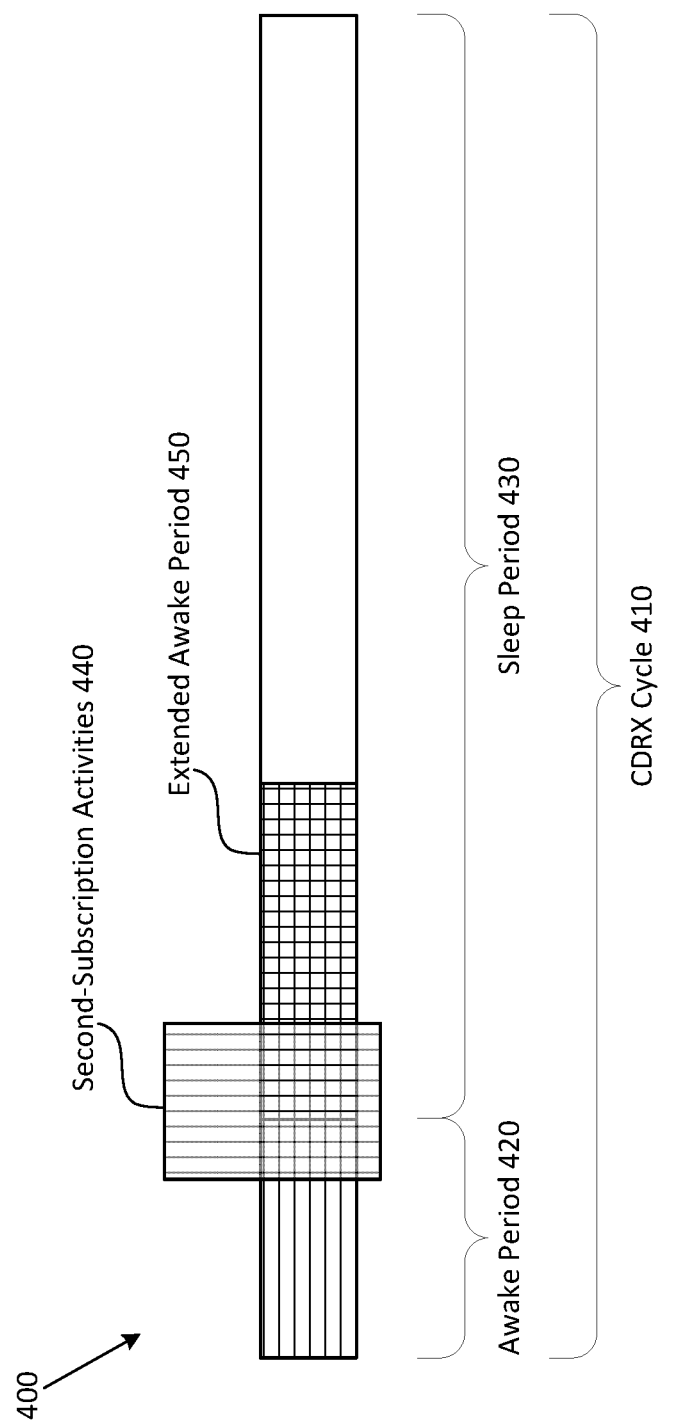
FIG. 4 is a schematic diagram illustrating an example of an extended awake period according to various embodiments.

FIG. 3 is a process flowchart diagram illustrating an example of a scheduling method 300 according to various embodiments. FIG. 4 is a schematic diagram 400 illustrating an example of an extended awake period 450 in a CDRX cycle 410 according to various embodiments. Referring to FIGS. 1-4, the CDRX cycle 410 may include an awake period 420 and a sleep period 430. The CDRX cycle 410 may be a Long CDRX cycle or a short CDRX cycle. During the awake period 420, the scheduling module 230 or the general-purpose processor 206 may configure the RF resource 218 to monitor downlink data in a PDSCH. The first mobile network 102 (e.g., the first base station 130) may send any downlink data blocks or downlink grants (collectively referred to as downlink data) to the wireless communication device 200 (110) during the awake period 420. Conventionally during the sleep period 430, the RF resource 218 may be shut off to conserve power. That is, the wireless communication device 200 may not receive any downlink data during the sleep period 430.

In some embodiments, the scheduling module 230 or the general-purpose processor 206 may determine the awake period 420 of the CDRX cycle 410 associated with the first subscription (enabled by SIM-1 204a) overlapping with the time the activities of the second subscription occur (enabled by the SIM-2 204b), at block B310. The activities of the second subscription may be represented by second-subscription activities 440. Examples of the second-subscription activities 440 may include, but not limited to, pages, neighbor cell searches, location update, full cell search, a combination thereof, and/or the like. In some embodiments, the second-subscription activities 440 may correspond to idle-mode process such as idle-mode reception activities, including receiving and decoding pages of the second subscription.

The RF resource 218 may be tuned away to the second subscription for the second-subscription activities 440 in a MSMS context.

As shown in the non-limiting example presented by FIG. 4, the time the second-subscription activities 440 occur may collide or overlap with an end portion of the awake period 420. In other embodiments, the time the second-subscription activities 440 occur may collide with any portion (e.g., a beginning portion, a middle portion, and/or the like) of the awake period 420. The time the second-subscription activities 440 occur may overlap with a portion of the sleep period 430 in some embodiments. In other embodiments, the time the second-subscription activities 440 occur may not overlap with the sleep period 430. Collision with the second-subscription activities 440 may indicate that some downlink data transmitted by the first base station 130 may not be received due to the second-subscription activities 440.

In some embodiments, the scheduling module 230 or the general-purpose processor 206 may extend the awake period 420 by the extended awake period 450 in response to determining the awake period 420 overlaps with the time the second-subscription activities occur 440, at block B320. The awake period 420 is extended by configuring the RF resource 218 to monitor downlink data in the PDSCH during the extended awake period 450, in addition to during the awake period 420. The extended awake period 450 may be after the second-subscription activities occur 440. In some embodiments, the extended awake period 450 may occur directly after the second-subscription activities 440 occur with no gap therebetween. In other embodiments, a gap (e.g., 1 ms, 2 ms, 5 ms, and/or the like) may be provided between the extended awake period 450 and the second-subscription activities 440.

In a scenario in which the second-subscription activities 440 ends before the awake period 420 ends, the scheduling module 230 or the general-purpose processor 206 may tune back to the first subscription for a remainder of the awake period 420. In this scenario, the extended awake period 450 may be after the awake period 420 with or without a gap therebetween.

The length of the extended awake period 450 may be based on Hybrid Automatic Repeat Request (HARQ) processes. The HARQ processes may be include forward error-correction and Automatic Repeat Request (ARQ) error control. Illustrating with a non-limiting example in which the first subscription is a LTE subscription, the downlink data Protocol Data Unit (PDU) may be repeated 8 ms based on the HARQ processes. Thus, the extended awake period 450 may have a length of 8 ms as well. Other suitable lengths of the extended awake period 450 such as, but not limited to, 1 ms, 2 ms, 5 ms, 10 ms, 16 ms, and/or the like may be implemented.

Within the extended awake period 450, the scheduling module 230 or the general-purpose processor 206 may be configured to check the PDSCH to determine whether the downlink data is directed to the wireless communication device 200. In some embodiments, the scheduling module 230 or the general-purpose processor 206 may determine whether the received downlink data may correspond to an identity of the wireless communication device 200. The identity of the wireless communication device may be determined based on an identifier, such as a Cell Radio Network Temporary Identifier (C-RNTI). For example, the downlink data received may be directed to the wireless communication device 200 if the downlink data is associated with a same C-RNTI as the wireless communication device. The C-RNTI may be a parameter assigned by the base station (e.g., the first base station 130) that uniquely identifies a wireless communication device (e.g., the wireless communication device 110) within a cell (e.g., the first cell 150). If the UE identity matches then the CDRX operation is abandoned and the UE moves into LTE connected mode (inactivity timer phase) as per regular operation/requirement. If the UE identity doesn't match, the UE moves into sleep mode and acts per CDRX operation.

Figure 5:
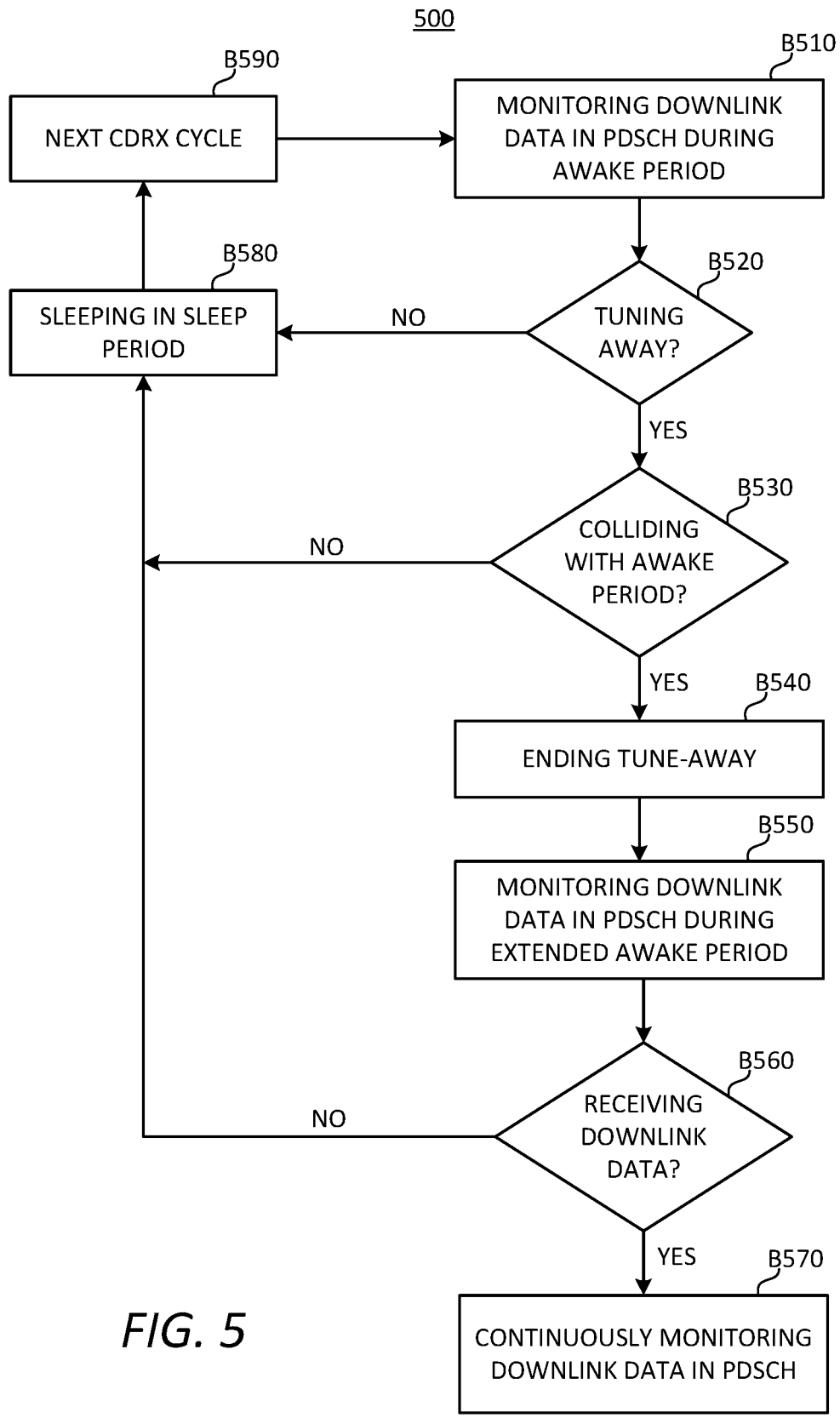
FIG. 5 is a process flow diagram illustrating an example of a scheduling method according to various embodiments.

FIG. 5 is a process flow diagram illustrating an example of a scheduling method 500 according to various embodiments. Referring to FIGS. 1-5, one or more of blocks B510-B590 may correspond to one or more of blocks B310-B320. At block B510, the scheduling module 230 or the general-purpose processor 206 may monitor the downlink data in the PDSCH during the awake period 420 of the CDRX cycle 410. The scheduling module 230 or the general-purpose processor 206 may configure the RF resource 218 to receive any downlink data in the PDSCH. The scheduling module 230 or the general-purpose processor 206 may attempt to decode the downlink data and check whether any downlink data is associated with the same C-RNTI as the wireless communication device 200.

At block B520, the scheduling module 230 or the general-purpose processor 206 may determine whether the RF resource 218 may be tuned away to the second subscription within the CDRX cycle 410 in some embodiments. The scheduling module 230 or the general-purpose processor 206 may determine some activities (e.g., periodic paging activities) of the second subscription in advance in the manner described. Other suitable triggers for periodic and aperiodic tune-aways may likewise indicate tune-aways to the second subscription. In response to determining that the RF resource 218 may not be tuned away to the second subscription (e.g., no second-subscription activities 440) (B520:NO), the scheduling module 230 or the general-purpose processor 206 may configure the wireless communication device 200 to sleep (e.g., shut off the RF resource 218) in the sleep period 430 at block B580. At block B590, the scheduling module 230 or the general-purpose processor 206 may configure the wireless communication device 200 to enter a next CDRX cycle such as, but not limited to, the CDRX cycle 410.

On the other hand, in response to determining that the RF resource 218 may be tuned away to the second subscription (e.g., the second-subscription activities 440 may occur) (B520:YES), the scheduling module 230 or the general-purpose processor 206 may determine whether the second-subscription activities 440 collides with data transfer on a first subscription during the awake period 420, at block B530. For instance, the scheduling module 230 or the general-purpose processor 206 may determine whether at least a portion of the second-subscription activities 440 may overlap with at least a portion of data transfer on the first subscription during the awake period 420 for usage of the RF resource 218. In response to determining that the second-subscription activities 440 does not collide during the awake period 420 (B530:NO), the scheduling module 230 or the general-purpose processor 206 may configure the wireless communication device 200 to sleep (e.g., shut off the RF resource 218) in the sleep period 430. At block B590, the scheduling module 230 or the general-purpose processor 206 may configure the wireless communication device 200 to enter a next CDRX cycle.

On the other hand, in response to determining the second-subscription activities 440 collide with data transfer on the first subscription during the awake period 420 (B530:YES), the scheduling module 230 or the general-purpose processor 206 may proceed with the tune-away (e.g., the second-subscription activities 440) until the tune-away ends, at block B540. In response to ending the second-subscription activities 440, the scheduling module 230 or the general-purpose processor 206 may configure the RF resource 218 to monitor downlink data in the PDSCH during the extended awake period 450 at block B550. The scheduling module 230 or the general-purpose processor 206 may configure the RF resource 218 to receive and/or decode any data in the PDSCH during the extended awake period 450. The extended awake period 450 may be subsequent to the second-subscription activities 440 (e.g., the tune-away interval).

At block B560, the scheduling module 230 or the general-purpose processor 206 may determine whether downlink data corresponding to the identity of the wireless communication device 200 has been received. The identity of the wireless communication device 200 may be based on the C-RNTI in the manner described. In response to determining that no downlink data corresponding to the identity of the wireless communication device 200 has been received (B560:NO), the scheduling module 230 or the general-purpose processor 206 may configure the wireless communication device 200 to sleep (e.g., shut off the RF resource 218) in the sleep period 430 (after the extended awake period 450 ends), at block B580. At block B590, the scheduling module 230 or the general-purpose processor 206 may configure the wireless communication device 200 to enter a next CDRX cycle.

On the other hand, in response to determining that downlink data corresponding to the identity of the wireless communication device 200 has been received (B560:YES), the scheduling module 230 or the general-purpose processor 206 may continuously monitor for additional downlink data in the PDSCH at block B570. The scheduling module 230 or the general-purpose processor 206 may configure the RF resource 218 for continuous reception, monitoring every subframe for additional downlink data. An inactivity timer may be set such that when the inactivity timer expires, the scheduling module 230 or the general-purpose processor 206 may configure the RF resource 218 to be in the CDRX mode instead of the continuous reception mode. Receiving additional downlink data during any subframe of the inactivity timer duration may extend the inactivity timer duration (e.g., delay the expiration of the inactivity timer). The inactivity timer may be started in response to the downlink data corresponding to the identity of the wireless communication device 200 being received in the awake period 420 or the extended awake period 450.

Figure 6:
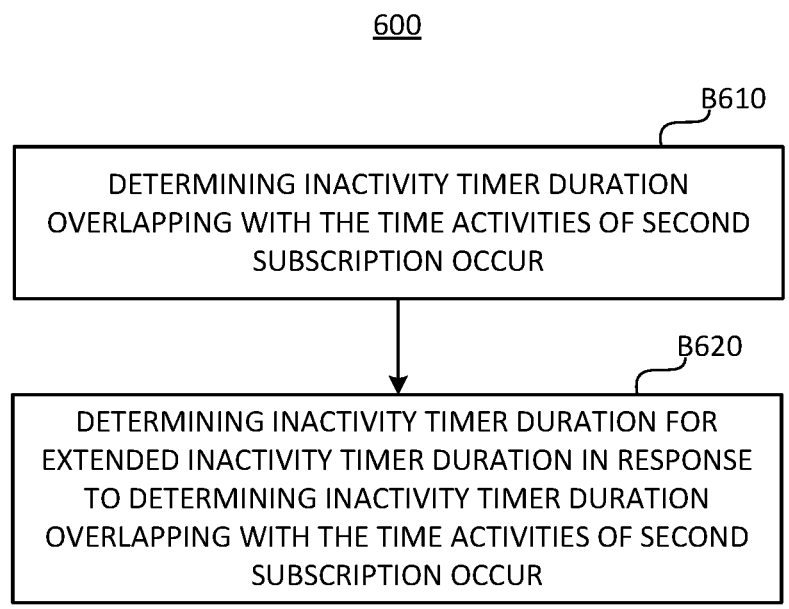
FIG. 6 is a process flow diagram illustrating an example of a scheduling method according to various embodiments.
Figure 7:
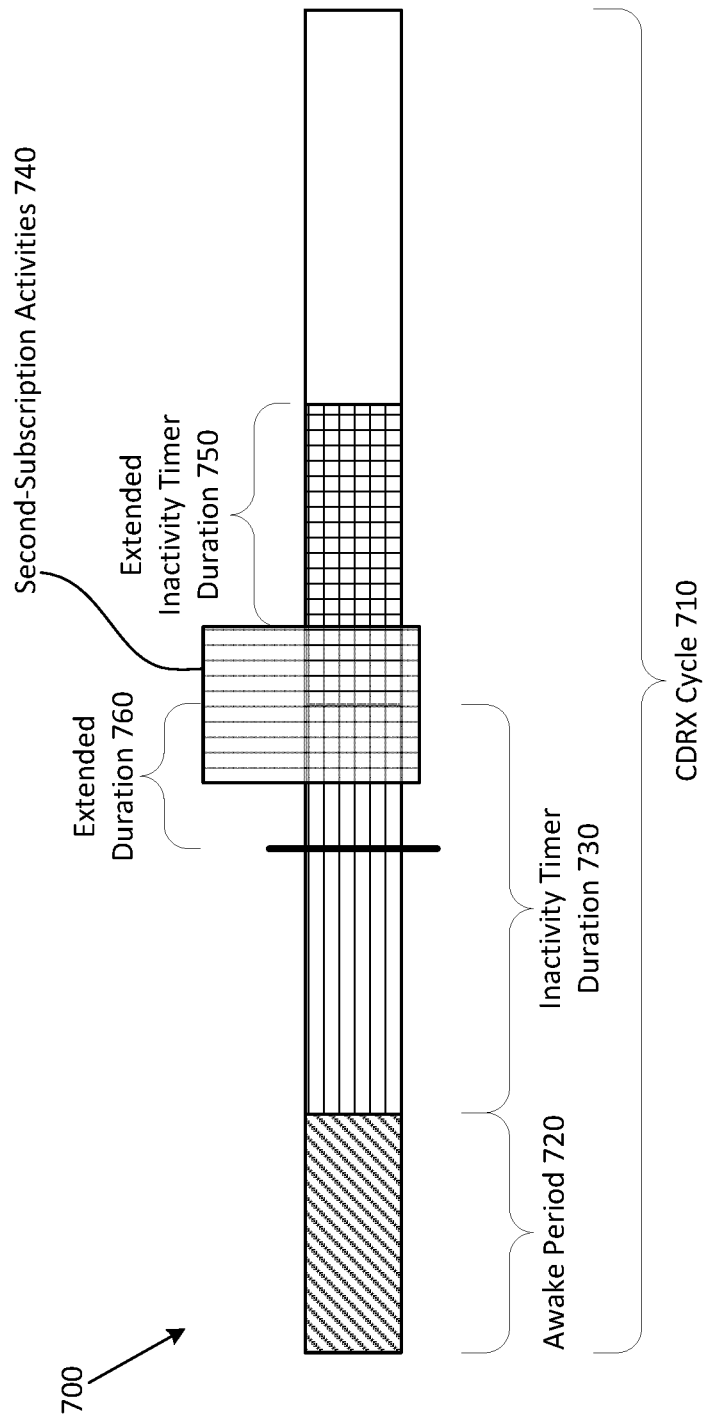
FIG. 7 is a schematic diagram illustrating an example of an extended inactivity timer duration according to various embodiments.

FIG. 6 is a process flow diagram illustrating an example of a scheduling method 600 according to various embodiments. FIG. 7 is a schematic diagram 700 illustrating an example of an extended inactivity timer duration 750 according to various embodiments. Referring to FIGS. 1-7, the CDRX cycle 710 associated with the first subscription may include at least an awake period 720. In response to receiving and decoding downlink data corresponding to the identity of the wireless communication device 200 for the first subscription, the scheduling module 230 or the general-purpose processor 206 may configure the RF resource 218 for continuous reception over the first subscription during an inactivity timer duration 730 (instead of going to a sleep period such as, but not limited to, the sleep period 430), corresponding to the inactivity timer initiated upon successful reception and decoding of the downlink data. The first mobile network 102 (e.g., the first base station 130) may sent downlink data to the wireless communication device 200 (110) during the inactivity timer duration 730. In the continuous reception mode, the scheduling module 230 or the general-purpose processor 206 may configure the RF resource 218 to monitor downlink data for the first subscription in the PDSCH before expiration of the inactivity timer duration 730. Receiving additional downlink data corresponding to the identity of the wireless communication device 200 may extend the inactivity timer duration 730.

At block B610, the scheduling module 230 or the general-purpose processor 206 may determine the inactivity timer duration 730 associated with the first subscription colliding with the time activities of the second subscription occur. The activities of the second subscription may be represented by second-subscription activities 740, which correspond to a tune-away period. Examples of the second-subscription activities 740 may include, but not limited to, pages, neighbor cell searches, location update, full cell search, a combination thereof, and/or the like. In some embodiments, the second-subscription activities 740 may correspond to idle-mode process such as idle-mode reception activities, including receiving and decoding pages of the second subscription. The RF resource 218 may be tuned away to the second subscription for the second-subscription activities 740 in a MSMS context, potentially causing reception failure for the portion of the inactivity timer duration 730 overlapping the time the second-subscription activities 740 occur.

In some embodiments, the inactivity timer duration 730 colliding with the second-subscription activities 740 may refer to the time the second-subscription activities 740 overlap with an end portion (e.g., an end duration 760) of the inactivity timer duration 730. The end duration 760 of the inactivity timer duration 730 may include a number of subframes prior the expiration of the inactivity timer duration 730. In some embodiments, the end duration 760 may be 8 subframes prior to the expiration of the inactivity timer duration 730. That is, the inactivity timer duration 730 may overlap with the time the second-subscription activities 740 occur if any of the last 8 subframes of the inactivity timer duration 730 overlaps with at least a portion of the time the second-subscription activities 740 occur.

Alternatively, the inactivity timer duration 730 overlapping with the time the second-subscription activities 740 occur may refer to the time the second-subscription activities 740 occur overlapping with any other portion (e.g., a beginning portion, a middle portion, and/or the like) of the inactivity timer duration 730. Collision with the second-subscription activities 740 may indicate that some downlink data transmitted by the first base station 130 may not be received due to the second-subscription activities 740.

In some embodiments, the scheduling module 230 or the general-purpose processor 206 may extend the inactivity timer duration 730 by the extended inactivity timer duration 750 in response to determining the inactivity timer duration 730 overlaps with the time the second-subscription activities 740 occur, at block B620. The inactivity timer duration 730 may be extended by configuring the RF resource 218 to monitor downlink data in the PDSCH during the extended inactivity timer duration 750, in addition to during the inactivity timer duration 730. The extended inactivity timer duration 750 may occur after the second-subscription activities 740 in some embodiments. For instance, the extended inactivity timer duration 750 may occur directly after the second-subscription activities 740 with no gap therebetween. In other embodiments, a gap (e.g., 1 ms, 2 ms, 5 ms, and/or the like) may be provided between the extended inactivity timer duration 750 and the second-subscription activities 740.

In a scenario in which the second-subscription activities 740 ends before the expiration of the inactivity timer duration 730, the scheduling module 230 or the general-purpose processor 206 may tune back to the first subscription for a remainder of the inactivity timer duration 730. In this scenario, the extended inactivity timer duration 750 may occur after the inactivity timer duration 730 with or without a gap therebetween.

The length of the extended inactivity timer duration 750 may be based on the HARQ processes. Illustrating with a non-limiting example in which the first subscription is a LTE subscription, the downlink data PDU may be repeated 8 ms based on the HARQ processes. Thus, the extended inactivity timer duration 750 may have a length of 8 ms as well in some embodiments. Other suitable lengths of the extended inactivity timer duration 750 such as, but not limited to, 1 ms, 2 ms, 5 ms, 10 ms, 16 ms, and/or the like may be implemented.

Within the extended inactivity timer duration 750, the scheduling module 230 or the general-purpose processor 206 may be configured to monitor the PDSCH to determine whether the downlink data is directed to the wireless communication device 200. In some embodiments, the scheduling module 230 or the general-purpose processor 206 may determine whether the received downlink data may correspond to an identity (e.g., the C-RNTI) of the wireless communication device 200. In response to receiving the downlink data corresponding to the identity of the wireless communication device 200 during the extended inactivity timer duration 750, the scheduling module 230 or the general-purpose processor 206 may extend the inactivity timer duration 730 (in addition to the extended inactivity timer duration 750) further, for an additional inactivity timer duration.

Figure 8:
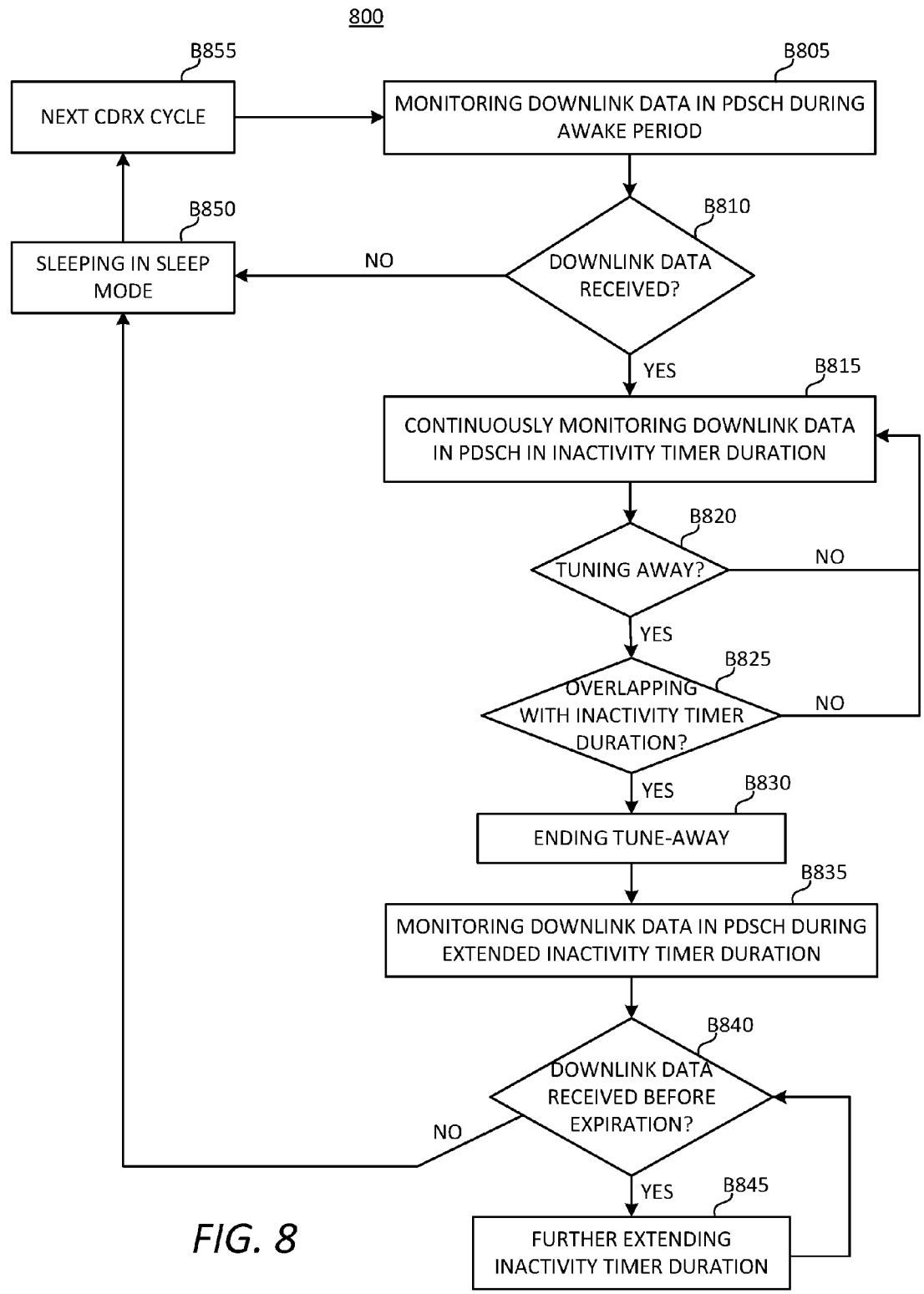
FIG. 8 is a process flow diagram illustrating an example of a scheduling method according to various embodiments.

FIG. 8 is a process flow diagram illustrating an example of a scheduling method 800 according to various embodiments. Referring to FIGS. 1-8, one or more of blocks B805-B855 may correspond to one or more of blocks B610-B620. At block B805, the scheduling module 230 or the general-purpose processor 206 may monitor the downlink data in the PDSCH during the awake period 720 of the CDRX cycle 710. The scheduling module 230 or the general-purpose processor 206 may configure the RF resource 218 to receive any downlink data in the PDSCH. The scheduling module 230 or the general-purpose processor 206 may attempt to decode the downlink data and check whether any downlink data is associated with the same C-RNTI (identity) as the wireless communication device 200.

At block B810, the scheduling module 230 or the general-purpose processor 206 may determine whether downlink data has been received during the awake period 720 that corresponds to the identity of the wireless communication device 200. In response to determining that no downlink data has been received that corresponds to the identity of the wireless communication device 200 (B810:NO), the scheduling module 230 or the general-purpose processor 206 may configure the wireless communication device 200 to sleep (e.g., shut off the RF resource 218) in a sleep period (such as, but not limited to, the sleep period 430) of the CDRX cycle 710 at block B850. At block B855, the scheduling module 230 or the general-purpose processor 206 may configure the wireless communication device 200 to enter a next CDRX cycle such as, but not limited to, the CDRX cycle 710.

On the other hand, in response to determining that downlink data has been received that corresponds to the identity of the wireless communication device 200 (B810:YES), the scheduling module 230 or the general-purpose processor 206 may continuously monitor (continuous reception) downlink data in the PDSCH in the inactivity timer duration 730 (until expiration), at block B815.

At block B820, the scheduling module 230 or the general-purpose processor 206 may determine whether the RF resource 218 may be tuned away to the second subscription in some embodiments. The scheduling module 230 or the general-purpose processor 206 may determine some activities (e.g., periodic paging activities) of the second subscription in advance in the manner described. Other suitable triggers for periodic and aperiodic tune-aways may likewise indicate tune-aways to the second subscription. In response to determining that the RF resource 218 may not be tuned away to the second subscription (e.g., no second-subscription activities 740) (B820:NO), the scheduling module 230 or the general-purpose processor 206 may configure the wireless communication device 200 to continuously monitor the downlink data in the inactivity timer duration 730 (until expiration), at block B815.

On the other hand, in response to determining that the RF resource 218 may be tuned away to the second subscription (e.g., the second-subscription activities 740 may occur) (B820:YES), the scheduling module 230 or the general-purpose processor 206 may determine whether the time the second-subscription activities 740 occur overlaps with the inactivity timer duration 730, at block B825. For instance, the scheduling module 230 or the general-purpose processor 206 may determine whether at least a portion of the time the second-subscription activities 740 occur may overlap with the end duration 760 of the inactivity timer duration 730 for usage of the RF resource 218. In response to determining that the time the second-subscription activities 740 occur does not collide with the inactivity timer duration 730 (B:825:NO), the scheduling module 230 or the general-purpose processor 206 may configure the wireless communication device 200 to continuously monitor the downlink data in the inactivity timer duration 730 (until expiration), at block B815.

On the other hand, in response to determining that the time the second-subscription activities 740 occur overlaps with the inactivity timer duration 730 (B825:YES), the scheduling module 230 or the general-purpose processor 206 may proceed with the tune-away (e.g., the second-subscription activities 740) until the tune-away ends, at block B830. In response to ending the second-subscription activities 740, the scheduling module 230 or the general-purpose processor 206 may configure the RF resource 218 to monitor downlink data in the PDSCH during the extended inactivity timer duration 750 at block B835. The scheduling module 230 or the general-purpose processor 206 may configure the RF resource 218 to receive and/or decode any downlink data in the PDSCH during the extended inactivity timer duration 750. The extended inactivity timer duration 750 may occur subsequent to the second-subscription activities 740 (e.g., the tune-away interval).

At block B840, the scheduling module 230 or the general-purpose processor 206 may determine whether downlink data has been received in the extended inactivity timer duration 750 before expiration of the extended inactivity timer duration 750. In response to determining that no downlink data has been received that corresponds to the identity of the wireless communication device 200 before expiration of the extended inactivity timer duration 750 (B840:NO), the scheduling module 230 or the general-purpose processor 206 may configure the wireless communication device 200 to sleep (e.g., shut off the RF resource 218) in a sleep period (such as, but not limited to, the sleep period 430) of the CDRX cycle 710 at block B850. At block B855, the scheduling module 230 or the general-purpose processor 206 may configure the wireless communication device 200 to enter a next CDRX cycle such as, but not limited to, the CDRX cycle 710.

On the other hand, in response to determining that downlink data has been received that corresponds to the identity of the wireless communication device 200 before expiration of the extended inactivity timer duration 750 (B840:YES), the scheduling module 230 or the general-purpose processor 206 may further extend the inactivity timer duration 730 by an additional inactivity timer duration. That is, the scheduling module 230 or the general-purpose processor 206 may configure the RF resource 218 to receive and decode for the additional inactivity timer duration extending beyond the expiration of the extended inactivity timer duration 750 in response to determining that downlink data has been received that corresponds to the identity of the wireless communication device 200 before expiration of the extended inactivity timer duration 750. At the expiration of the additional inactivity timer duration, the scheduling module 230 or the general-purpose processor 206 may determine whether downlink data has been received in the additional inactivity timer duration before expiration of the additional inactivity timer duration.

Figure 9:
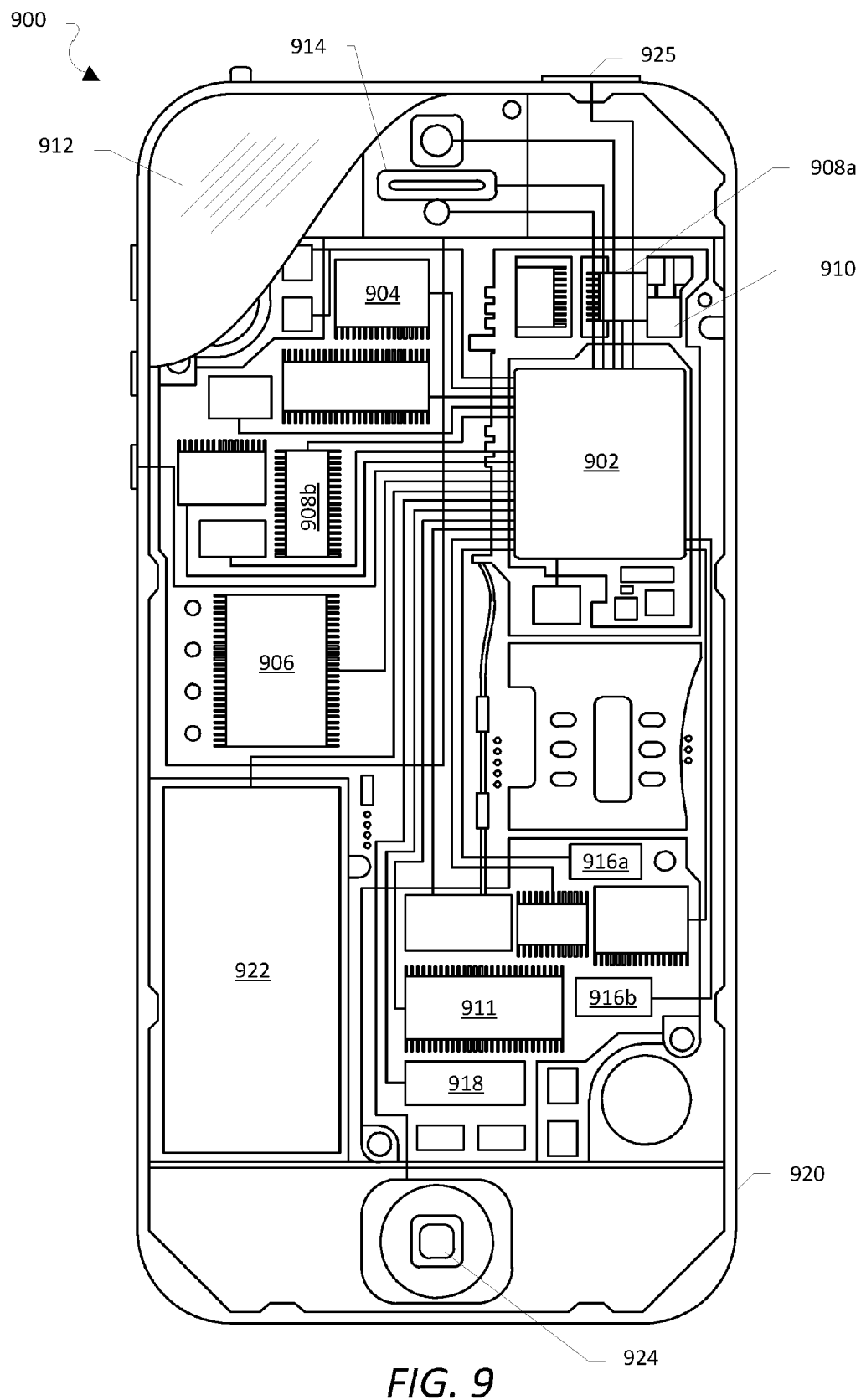
FIG. 9 is a component block diagram of a wireless communication device suitable for use with various embodiments.

The various embodiments may be implemented in any of a variety of wireless communication devices 110 and 200, an example of which is illustrated in FIG. 9, as a wireless communication device 900. As such, the wireless communication device 900 may implement the process and/or the apparatus of FIGS. 1-9, as described herein.

With reference to FIGS. 1-9, the wireless communication device 900 may include a processor 902 coupled to a touchscreen controller 904 and an internal memory 906. The processor 902 may be one or more multi-core integrated circuits designated for general or specific processing tasks. The memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the wireless communication device 900 need not have touch screen capability.

The wireless communication device 900 may have one or more cellular network transceivers 908a, 908b coupled to the processor 902 and to at least one antenna 910 and configured for sending and receiving cellular communications. The transceivers 908a, 908b and antenna 910 may be used with the above-mentioned circuitry to implement the various embodiment methods. The cellular network transceivers 908a, 908b may be the RF resource 218. The antenna 910 may be the antenna 220. The wireless communication device 900 may include two or more SIM cards 916a, 916b, corresponding to SIM-1 204a and SIM-2 204b (respectively), coupled to the transceivers 908a, 908b and/or the processor 902. The wireless communication device 900 may include a cellular network wireless modem chip 911 (e.g., the baseband modem processor 216) that enables communication via at least one cellular network and is coupled to the processor 902.

The wireless communication device 900 may include a peripheral device connection interface 918 coupled to the processor 902. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port (not shown).

The wireless communication device 900 may also include speakers 914 for providing audio outputs. The wireless communication device 900 may also include a housing 920, constructed of a plastic, metal, or a combination of materials, for containing all or some of the components discussed herein. The wireless communication device 900 may include a power source 922 coupled to the processor 902, such as a disposable or rechargeable battery. The rechargeable battery may also be coupled to a peripheral device connection port (not shown) to receive a charging current from a source external to the wireless communication device 900. The wireless communication device 900 may also include a physical button 924 for receiving user inputs. The wireless communication device 900 may also include a power button 926 for turning the wireless communication device 900 on and off.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to some embodiments without departing from the spirit or scope of the embodiments. Thus, the present embodiments is not intended to be limited to the embodiments shown herein but is to be accorded the widest scope consistent with the following claims and the principles and novel features disclosed herein.

What is claimed is:

1. A method for a wireless communication device having a first Subscriber Identity Module (SIM) associated with a first subscription and a second SIM associated with a second subscription to manage communications over the first subscription and the second subscription, the method comprising:
   determining that data transfer during an awake period of a Connected Discontinuous Reception (CDRX) cycle associated with the first subscription collides with activities of the second subscription; and
   extending the awake period by an extended awake period in response to determining that the data transfer during the awake period collides with the activities of the second subscription, the extended awake period being within the same CDRX cycle for which the data transfer is determined to collide.

2. The method of claim 1, further comprising configuring a Radio Frequency (RF) resource of the wireless communication device to monitor downlink data in a Physical Downlink Shared Channel (PDSCH) during the awake period.

3. The method of claim 2, further comprising tuning the RF resource away from the first subscription to the second subscription for the activities of the second subscription.

4. The method of claim 1, wherein determining that the data transfer during the awake period collides with the activities of the second subscription comprises determining that at least a portion of the data transfer during the awake period collides with at least a portion of the activities of the second subscription.

5. The method of claim 1, wherein the activities of the second subscription comprises idle-mode reception activities of the second subscription.

6. The method of claim 1, wherein the idle-mode reception activities of the second subscription comprises receiving and decoding pages of the second subscription.

7. The method of claim 1, wherein extending the awake period by the extended awake period comprises configuring a Radio Frequency (RF) resource of the wireless communication device to monitor downlink data in a Physical Downlink Shared Channel (PDSCH) during the extended awake period.

8. The method of claim 7, further comprising:
   receiving the downlink data in the PDSCH during the extended awake period, wherein the received downlink data corresponds to an identity of the wireless communication device; and
   continuously monitoring for downlink data in the PDSCH in response to receiving the downlink data during the extended awake period.

9. The method of claim 1, wherein the extended awake period occurs after a tune-away period corresponding to the activities of the second subscription.

10. The method of claim 1, wherein a length of the extended awake period is 8 ms.

11. The method of claim 1, wherein a length of the extended awake period is determined based on Hybrid Automatic Repeat Request (HARD) processes.

12. The method of claim 1, wherein the first subscription is a Long Term Evolution (LTE) subscription associated with the CDRX.

13. The method of claim 1, further comprising:
   determining that downlink data has been received during the extended awake period; and
   in response to determining that downlink data has been received during the extended awake period, setting an inactivity timer duration.

14. A wireless communication device, comprising:
   at least one Radio Frequency (RF) resource;
   a processor operably connected to said at least one RF resource configured to connect to a first Subscriber Identity Module (SIM) associated with a first subscription and to a second SIM associated with a second subscription, and configured to:
      determine that data transfer during an awake period of a Connected Discontinuous Reception (CDRX) cycle associated with the first subscription collides with activities of the second subscription; and
      extend the awake period by an extended awake period in response to determining that the data transfer during the awake period collides with the activities of the second subscription, the extended awake period being within the same CDRX cycle for which the data transfer is determined to collide; and a memory.

15. The wireless communication device of claim 14, the processor is configured to extend the awake period by the extended awake period by configuring the at least one RF resource to monitor downlink data in a Physical Downlink Shared Channel (PDSCH) during the extended awake period.

16. The wireless communication device of claim 15, wherein the processor is further configured to:
receive the downlink data in the PDSCH during the extended awake period, wherein the received downlink data corresponds to an identity of the wireless communication device; and
continuously monitor for downlink data in the PDSCH in response to receiving the downlink data during the extended awake period.

17. A method for a wireless communication device having a first Subscriber Identity Module (SIM) associated with a first subscription and a second SIM associated with a second subscription to manage communications over the first subscription and the second subscription, the method comprising:
determining that an inactivity timer duration overlaps with the time the activities of the second subscription occur; and
extending the inactivity timer duration for an extended inactivity timer duration in response to determining that the inactivity timer duration overlaps with the time the activities of the second subscription occur.

18. The method of claim 17, further comprising:
configuring a Radio Frequency (RF) resource of the wireless communication device to monitor downlink data in a Physical Downlink Shared Channel (PDSCH) during an awake period of a Connected Discontinuous Reception (CDRX) cycle associated with the first subscription; and
receiving the downlink data during the awake period.

19. The method of claim 17, further comprising monitoring downlink data in a Physical Downlink Shared Channel (PDSCH) during the inactivity timer duration.

20. The method of claim 19, further comprising tuning the RF resource away from the first subscription to the second subscription for the activities of the second subscription.

21. The method of claim 17, wherein determining that the inactivity timer duration collides with the time the activities of the second subscription occur comprises determining that at least a portion of the inactivity timer duration collides with at least a portion of the time the activities of the second subscription occur.

22. The method of claim 21, wherein the at least a portion of the inactivity timer duration comprises an end duration of the inactivity timer duration, wherein the end duration comprises at least one subframe before expiration of the inactivity timer duration.

23. The method of claim 22, wherein the end duration comprises 8 subframes before the expiration of the inactivity timer duration.

24. The method of claim 17, wherein the activities of the second subscription comprises idle-mode reception activities of the second subscription.

25. The method of claim 24, wherein the idle-mode reception activities of the second mode comprises receiving and decoding pages of the second subscription.

26. The method of claim 17, wherein extending the inactivity timer duration for the extended inactivity timer duration comprises configuring a Radio Frequency (RF) resource of the wireless communication device to monitor downlink data in a Physical Downlink Shared Channel (PDSCH) during the extended inactivity timer duration.

27. The method of claim 26, further comprising:
receiving the downlink data during the extended inactivity timer duration; and
extending the inactivity timer duration for an additional inactivity timer duration in response to receiving the downlink data during the extended inactivity timer duration.

28. The method of claim 17, wherein the extended inactivity timer duration is after a tune-away period corresponding to the activities of the second subscription.

29. The method of claim 17, wherein, in response to receiving downlink data during the extended inactivity timer duration, the extended inactivity timer duration is further extended for an additional extended inactivity timer duration.

30. A wireless communication device, comprising:
at least one Radio Frequency (RF) resource;
a processor configured to connect to a first Subscriber Identity Module (SIM) associated with a first subscription and to a second SIM associated with a second subscription, and configured with processor-executable instructions to:
determine that an inactivity timer duration overlaps with the time activities of the second subscription occur; and
extend the inactivity timer duration for an extended inactivity timer duration in response to determining that the inactivity timer duration overlaps with the time the activities of the second subscription occur; and
a memory.

31. The wireless communication device of claim 30, wherein the processor is configured to determine that an end duration of the inactivity timer duration overlaps with the time the activities of the second subscription occur, wherein the end duration comprises at least one subframe before expiration of the inactivity timer duration.

32. The wireless communication device of claim 30, wherein the processor is configured to extend the inactivity timer duration for the extended inactivity timer duration by configuring a Radio Frequency (RF) resource of the wireless communication device to monitor downlink data in a Physical Downlink Shared Channel (PDSCH) during the extended inactivity timer duration.

* * * * *